(12) United States Patent
Owen et al.

(10) Patent No.: US 7,962,253 B1
(45) Date of Patent: Jun. 14, 2011

(54) INTEGRATED BAROMETRIC ALTITUDE AND SATELLITE ALTITUDE-BASED VERTICAL NAVIGATION SYSTEM

(75) Inventors: Gary L. Owen, Robins, IA (US); James A. Young, Jr., Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1177 days.

(21) Appl. No.: 11/657,874

(22) Filed: Jan. 24, 2007

(51) Int. Cl.
*G01C 23/00* (2006.01)

(52) U.S. Cl. .......................................... 701/4; 340/973

(58) Field of Classification Search ................. 701/3–4, 701/14; 340/973–980, 947; 244/164, 75.1, 244/180–186
See application file for complete search history.

(56) References Cited

U.S. PATENT DOCUMENTS

| 4,012,626 | A  | * | 3/1977 | Miller et al. | 701/218 |
| 5,745,863 | A  | * | 4/1998 | Uhlenhop et al. | 701/14 |
| 7,215,256 | B2 | * | 5/2007 | Reusser et al. | 340/975 |
| 7,216,069 | B2 | * | 5/2007 | Hett | 703/6 |

* cited by examiner

*Primary Examiner* — Dalena Tran
(74) *Attorney, Agent, or Firm* — Matthew J. Evans; Daniel M. Barbieri

(57) ABSTRACT

A flight management system (FMS) for an aircraft, that includes an integrated barometric altitude and satellite altitude-based vertical navigation (VNAV) system. The integrated barometric altitude and satellite altitude-based vertical navigation system, includes an altitude blending component for providing a smooth transition from a barometric altimetry source to a satellite altimetry source; and, a satellite altitude containment component operatively connected to the altitude blending component for limiting the difference of a barometric altitude path deviation to within a desired margin of a satellite altitude path deviation.

14 Claims, 3 Drawing Sheets

INTEGRATED BAROMETRIC ALTITUDE AND SATELLITE ALTITUDE-BASED VERTICAL NAVIGATION SYSTEM

BACKGROUND OF THE INVENTION

1. Field of the Invention

The present invention relates generally to vertical navigation (VNAV) systems for aircraft and more particularly to an integrated barometric altitude and satellite altitude-based system for enhancing aircraft flight management system (FMS) vertical navigation systems.

2. Description of the Related Art

Present day FMS VNAV designs lack the capability to support LPV approaches which make use of the FAA's new Wide-Area Augmentation System (WAAS) and/or Satellite Based Augmentation System (SBAS) technologies. The new capability requires use of barometric altitude in the beginning of an aircraft descent with a transition to a satellite altitude-based system for the final approach. However, presently a seamless methodology is lacking for providing this transition. The present invention provides a means to smoothly integrate current baro altitude-based VNAV with GNSS altitude in the intermediate and final approach path vertical deviation computations to support this new capability.

SUMMARY OF THE INVENTION

In a broad aspect, the present invention is a flight management system (FMS) for an aircraft, that includes an integrated barometric altitude and satellite altitude-based vertical navigation (VNAV) system. The integrated barometric altitude and satellite altitude-based vertical navigation system, includes an altitude blending component for providing a smooth transition from a barometric altimetry source to a satellite altimetry source; and, a satellite altitude containment component operatively connected to the altitude blending component for limiting the difference of a barometric altitude path deviation to within a desired margin of a satellite altitude path deviation.

DETAILED DESCRIPTION OF THE INVENTION

Figure 1:
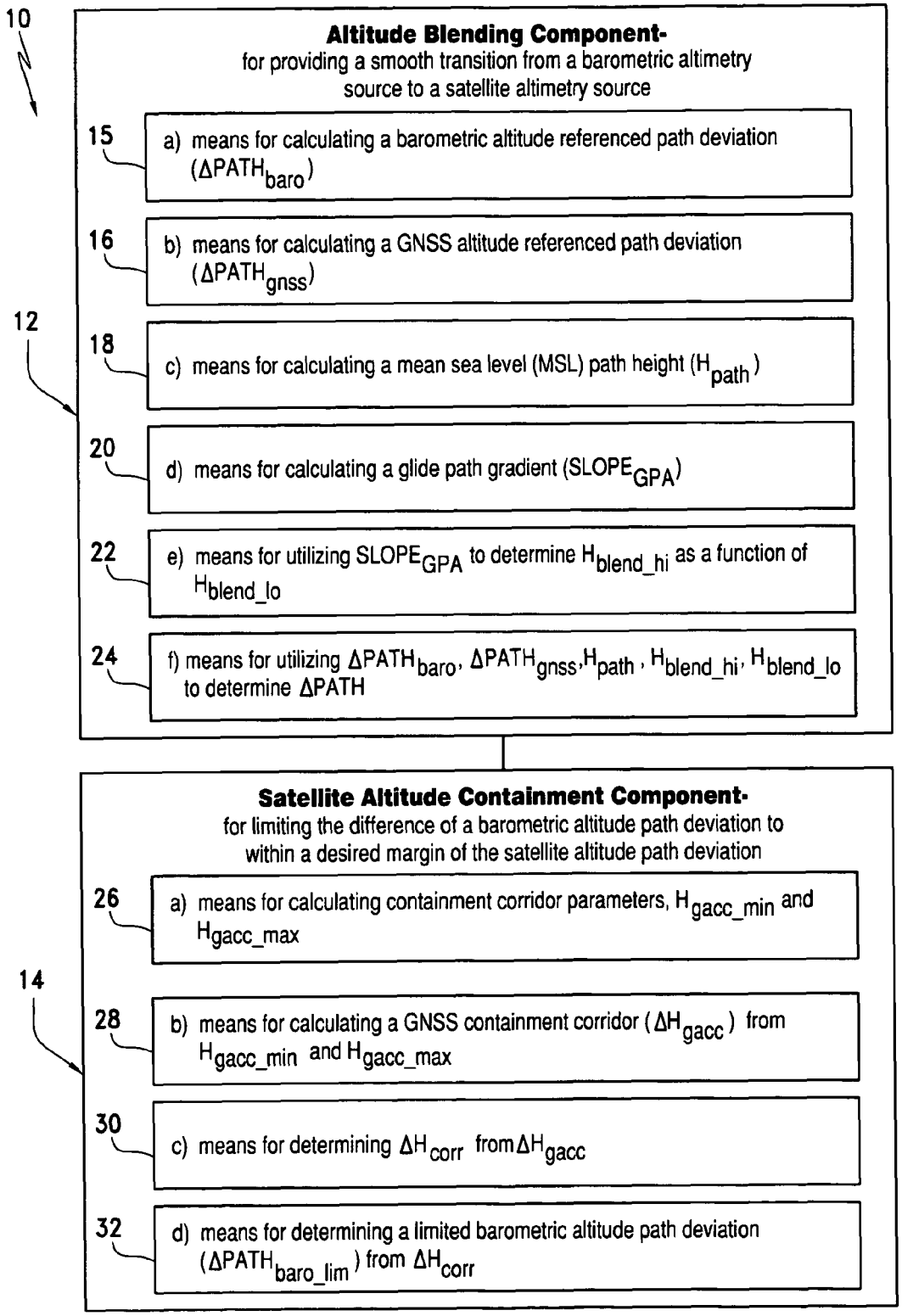
FIG. 1 is a flow chart illustrating the integrated barometric altitude and satellite altitude-based vertical navigation (VNAV) system of the present invention.

Referring now to the drawings and the characters of reference marked thereon, FIG. 1 illustrates an integrated barometric altitude and satellite altitude-based vertical navigation (VNAV) system for a flight management system in accordance with the principles of the present invention, designated generally as 10. The integrated barometric altitude and satellite altitude-based VNAV system 10 includes an altitude blending component, designated generally as 12, for providing a smooth transition from a barometric altimetry source to a satellite altimetry source. A satellite altitude containment corridor component 14 is operatively connected to the altitude blending component for limiting the difference of a barometric altitude path deviation to within a desired margin of a satellite altitude path deviation. These two features as described below in detail enhance the existing FMS VNAV function. The current barometric altitude-based VNAV can be expanded to integrate use of global navigational satellite system (GNSS) altitude in the path deviation computations.

Figure 2:
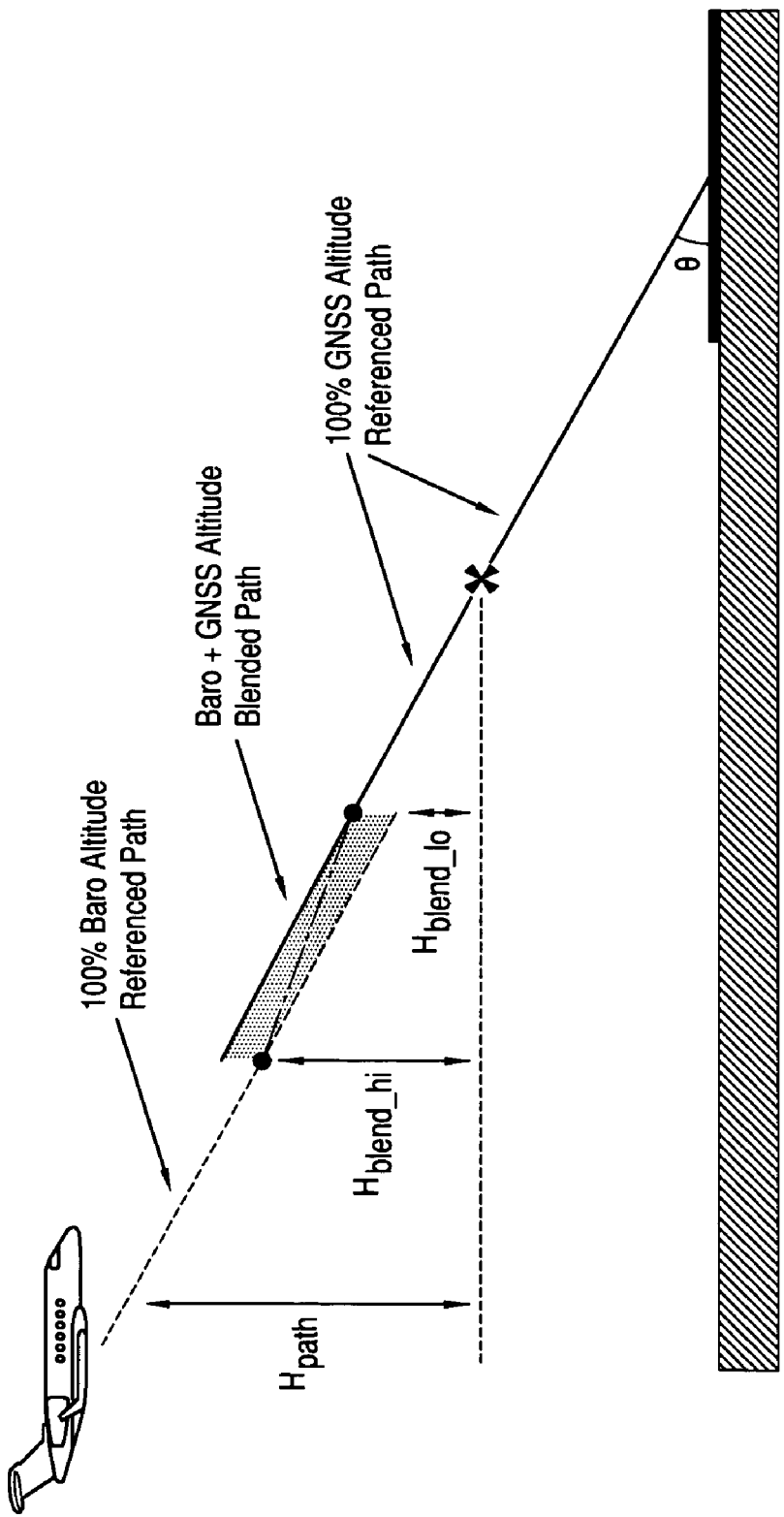
FIG. 2 is a schematic illustration of the descent path of an aircraft showing the altitude blending component of the integrated barometric altitude and satellite altitude-based vertical navigation system of the present invention.
Figure 3:
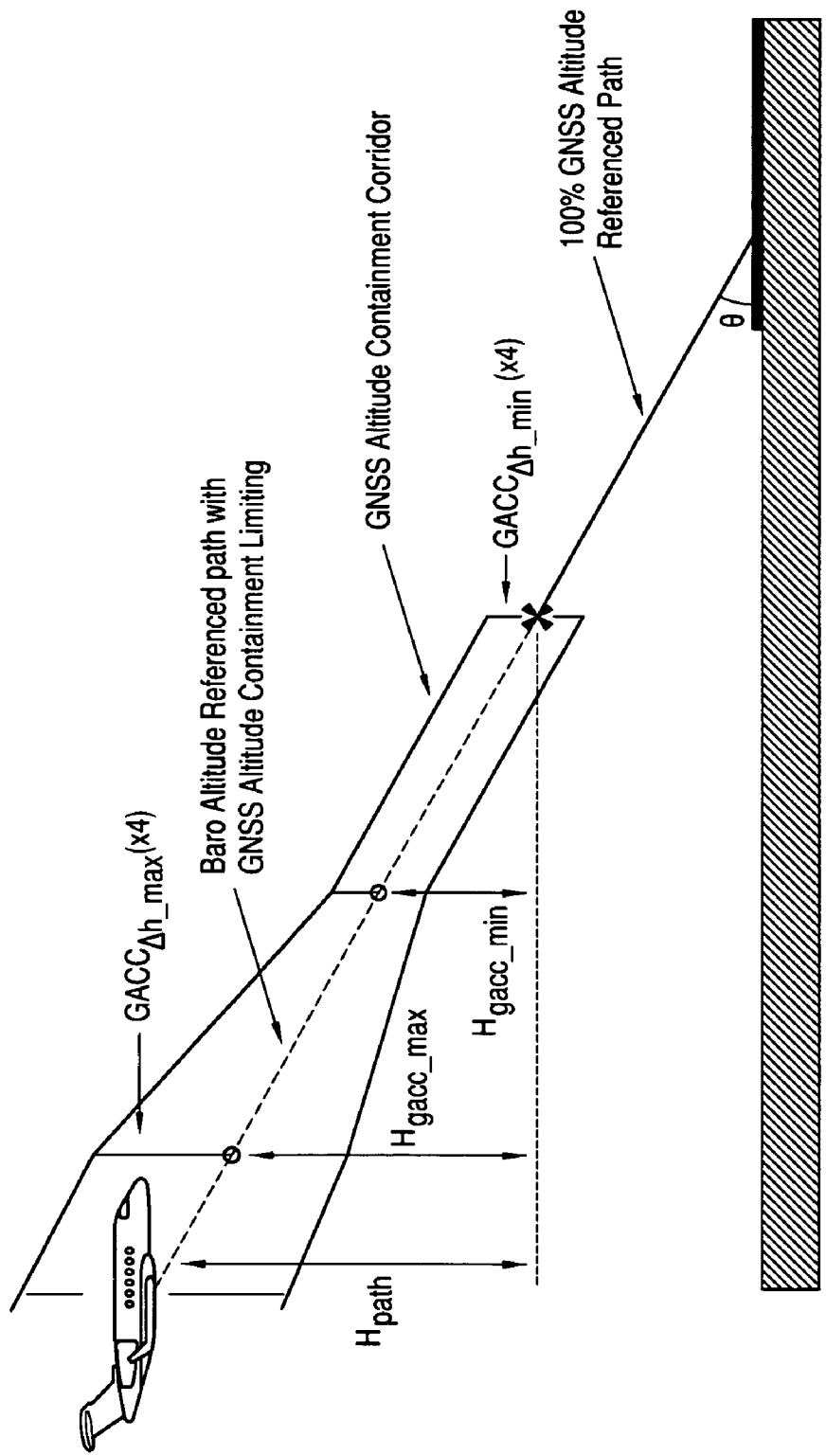
FIG. 3 is a schematic illustration of the descent path showing the satellite altitude containment corridor component of the integrated barometric altitude and satellite altitude-based vertical navigation system.

FIG. 2 shows the components used by the altitude blending component 12 for blending the barometric altitude and GNSS altitude path deviations together. The blending technique allows for a smooth transition from using one altimetry source to the other in the VNAV solution for approach. FIG. 3 depicts the components of the satellite altitude containment corridor component 14. The corridor component 14 is used to limit the difference of the baro VNAV solution to within some margin of the GNSS altitude when baro VNAV is still used in the VNAV solution just prior to when the blending occurs.

VNAV Path Deviation Referenced to Baro Altitude

As can be seen by reference to FIG. 1, a first step 15 of the altitude blending component 12 is to calculate a barometric altitude referenced path deviation ($\Delta PATH_{baro}$). The baro altitude referenced path deviation ($\Delta PATH_{baro}$) represents the difference between the VNAV descent path referenced to mean sea level (MSL) and current aircraft altitude as measured by the Air Data Computer (ADC). Sensed baro-corrected altitude is used to measure this difference as shown in the following equation:

$$\Delta PATH_{baro} = ALT_{a/c\_baro} - PATH_{alt\_msl}, \text{ where:}$$

$\Delta PATH_{baro}$ is defined as the deviation from a VNAV descent path using barometric altitude. A positive value represents an above path situation and a negative value represents a below path situation.

$ALT_{a/c\_baro}$ is defined as the sensed pressure altitude corrected for local atmospheric pressure (i.e., baro altitude) measured by the ADC.

$PATH_{alt\_msl}$ is defined as the vertical point (i.e., altitude) on the FMS VNAV descent path, which corresponds to aircraft lateral present position, referenced to MSL.

VNAV Path Deviation Referenced to GNSS Altitude

A second step 16 of the altitude blending component 12 is to calculate the GNSS altitude referenced path deviation ($\Delta PATH_{gnss}$). The GNSS altitude referenced path deviation ($\Delta PATH_{gnss}$) represents the difference between the VNAV descent path referenced to MSL and current aircraft altitude as measured by the GPS receiver. Sensed GNSS altitude is used to measure this difference as shown in the following equation:

$$\Delta PATH_{gnss} = ALT_{a/c\_gnss} - PATH_{alt\_msl}, \text{ where:}$$

$ALT_{a/c\_gnss}$ is defined as the sensed GNSS altitude measured by a GPS receiver; and, $PATH_{alt\_msl}$ is the vertical point on the FMS VNAV descent path referenced to the MSL.

A positive value for $\Delta PATH_{gnss}$ represents an above path situation and a negative value represents a below path situation.

MSL Path Height

In a next step, represented by numeral designation 18, the mean sea level (MSL) path height ($H_{path}$) is calculated. (See also FIG. 2.) The path height $H_{path}$ represents height above the flight plan final approach fix (FAF) referenced to the vertical point on the FMS VNAV descent path corresponding to the aircraft lateral present position and is calculated using the following equation:

$$H_{path} = PATH_{alt\_msl} - PATH_{alt\_msl\_FAF}, \text{ where:}$$

PATH$_{alt\_msl}$ is the vertical point on the FMS VNAV descent path referenced to said MSL; and PATH$_{alt\_msl\_FAF}$ is defined as the vertical point (i.e., altitude) on the VNAV descent path at the FAF.

Glide Path Gradient

Next, a glide path gradient (SLOPE$_{GPA}$) is calculated (see process block 20) where SLOPE$_{GPA}$ is defined as the glide path gradient (typically in ft per nautical mile (ft/NM)) representing the vertical gradient on final approach. The glide path gradient is a function of the final approach glide path angle and is represented by the following equation:

SLOPE$_{GPA}$=tan(θ)*6076.115, where:

θ is defined as the final approach glide path angle referenced to the horizontal plane in degrees.

tan(θ) is the tangent function and is unitless.

6076.115 is a conversion factor which represents ft/NM.

The glide path angle θ is assumed to be a positive value.

Blending Parameters

The path deviation blending algorithms use two parameters to smoothly transition the vertical guidance cue (i.e., path deviation information) from the baro altitude-referenced path to the GNSS altitude-referenced path. The parameters are two path heights above the FAF where: 1) the path deviation blending starts (H$_{blend\_hi}$); and, 2) the path deviation blending ends (H$_{blend\_lo}$). (See process block 22.)

SLOPE$_{GPA}$ is utilized to determine H$_{blend\_hi}$ as a function of H$_{blend\_lo}$, where H$_{blend\_lo}$ is defined as the path height above the FAF where the limited barometric altitude to GNSS altitude blending ends and is a constant (typically in ft), and H$_{blend\_hi}$ is defined as the path height above the FAF where the barometric altitude to GNSS altitude blending starts (typically in ft). The values for the two path heights are determined as follows:

$$H_{blend\_hi} = \left(\frac{GACC_{\Delta h\_min}}{SLOPE_{blend}} * SLOPE_{GPA}\right) + H_{blend\_lo}, \text{ where:}$$

GACC$_{\Delta h\_min}$ is the allowable difference between baro altitude and GNSS altitude based path deviations for the minimum width of the GACC and is a constant (typically in ft); and, SLOPE$_{blend}$ is defined as the slope of the baro altitude to GNSS altitude blending and is a constant in (typically in ft/NM).

The typical value for the H$_{blend\_lo}$ constant is 0 ft. The typical value for the GACC$_{\Delta h\_min}$ constant is 200 ft. The typical value for the SLOPE$_{blend}$ constant is 100 ft/NM.

In the final step (process block 24) of the altitude blending component ΔPATH$_{baro}$, ΔPATH$_{gnss}$, H$_{path}$, H$_{blend\_hi}$, H$_{blend\_lo}$ are used to determine ΔPATH, as will be discussed below.

Containment Corridor Parameters

The path deviation containment corridor algorithms use two parameters to smoothly limit the vertical guidance cue (i.e., path deviation information) of the baro altitude-referenced path from a wide margin of the GNSS altitude-referenced path to a narrow margin. See process block 26 in FIG. 1. Additionally, the components of the GNSS Altitude Containment Corridor (GACC) are shown in FIG. 2. The parameters are two path heights above the FAF where: 1) the path deviation limit ramping starts (H$_{gacc\_max}$); and, 2) the path deviation limit ramping ends (H$_{gacc\_min}$). The values for the two path heights are determined as follows:

H$_{gacc\_min}$=H$_{blend\_hi}$ $$H_{gacc\_max} = \left[\frac{(GACC_{\Delta h\_max} - GACC_{\Delta h\_min})}{SLOPE_{gacc}} * SLOPE_{GPA}\right] + H_{gacc\_min},$$

where:

H$_{gacc\_min}$ is defined as the path height above the FAF where the barometric altitude to GNSS altitude path deviation limit ramping ends (typically in ft); and H$_{gacc\_max}$ is the path height above the FAF where the baro altitude to GNSS altitude path deviation limit ramping starts (typically in ft).

H$_{blend\_hi}$ is the path height above the FAF where the baro altitude to GNSS altitude blending starts in ft;

ΔH$_{gacc}$ is defined as the allowable difference between barometric altitude and GNSS altitude based path deviations of the GACC at the aircraft lateral present position;

GACC$_{\Delta h\_max}$ is the maximum allowable difference between barometric altitude and GNSS altitude based path deviations of the GACC;

GACC$_{\Delta h\_min}$ is the minimum allowable difference between barometric altitude and GNSS altitude based path deviations of the GACC;

SLOPE$_{gacc}$ is defined as the slope of the barometric altitude to GNSS altitude path deviation limit ramping and is a constant (typically in ft/NM); and, SLOPE$_{GPA}$ is the glide path gradient (typically in ft/NM).

A typical value for the GACC$_{\Delta h\_max}$ constant is 1000 ft. A typical value for the SLOPE$_{gacc}$ constant is 200 ft/NM.

GNSS Altitude Containment Corridor

The GACC is used to bound the baro altitude path deviation to a specified margin of the GNSS altitude path deviation depending on the lateral location of the aircraft within the corridor. In cases where the baro altitude path deviation is significantly different from the corresponding GNSS altitude deviation, the baro altitude path deviation is limited. A linear taper is used to smoothly transition the containment limit from a wide margin to a narrow margin as the aircraft descends. The GACC path deviation margin is a function of path height above the FAF and automatically compensates for the glide path angle intended to be flown on final approach. The satellite altitude containment corridor component 14 includes means for calculating a GNSS containment corridor (ΔH$_{gacc}$) from the H$_{gacc\_min}$ and H$_{gacc\_max}$ (see block 28). The path deviation containment operation is represented by the following algorithms, where:

If H$_{path}$≥H$_{gacc\_max}$, then:

ΔH$_{gacc}$=GACC$_{\Delta h\_max}$ else if H$_{path}$≤H$_{gacc\_min}$, then:

ΔH$_{gacc}$=GACC$_{\Delta h\_min}$ else:

$$\Delta H_{gacc} = \left[\frac{(H_{path} - H_{gacc\_min}) * (GACC_{\Delta h\_max} - GACC_{\Delta h\_min})}{(H_{gacc\_max} - H_{gacc\_min})}\right] + GACC_{\Delta h\_min}$$

If H$_{path}$≤0, then:

ΔH$_{gacc}$=0

H$_{path}$ is the height above the FAF referenced to the vertical point on the FMS VNAV descent path corresponding to aircraft lateral present position;

ΔH$_{gacc}$ is defined as the allowable difference between barometric altitude and GNSS altitude based path deviations of the GACC at the aircraft lateral present position;

$GACC_{\Delta h\_max}$ is the maximum allowable difference between barometric altitude and GNSS altitude based path deviations of the GACC; and, $GACC_{\Delta h\_min}$ is the minimum allowable difference between barometric altitude and GNSS altitude based path deviations of the GACC.

Limited Baro Altitude Path Deviation

In cases where the baro altitude path deviation exceeds the GACC boundary, the deviation is limited to the GACC boundary. The limited baro altitude path deviation is then used for blending with the GNSS altitude path deviation as the aircraft nears the FAF. The limited baro altitude path deviation is calculated using the following algorithms.

First the difference between the baro and GNSS altitude path deviations ($\Delta H_{a/c}$) is determined as follows:

$$\Delta H_{a/c} = \Delta PATH_{baro} - \Delta PATH_{gnss}, \text{ where,}$$

$\Delta H_{a/c}$ is defined as the difference between the barometric and GNSS altitude path deviations at the aircraft lateral present position;

$\Delta PATH_{baro}$ is the deviation from the VNAV descent path using barometric altitude; and, $\Delta PATH_{gnss}$ is the deviation from the VNAV descent path using GNSS altitude.

Once $\Delta H_{a/c}$ is determined, the path deviations difference correction ($\Delta H_{corr}$) is calculated using the following equation (see also, process block 30):

$$\Delta H_{corr} = \Delta H_{a/c} - [\text{sign}(\Delta H_{a/c}) * \Delta H_{gacc}], \text{ where:}$$

$\Delta H_{a/c}$ is the difference between the barometric and GNSS altitude path deviations at the aircraft lateral present position.

The limited baro altitude path deviation can now be calculated (process block 32) per the following algorithms:

If $|\Delta H_{a/c}| \geq \Delta H_{gacc}$, then:

$$\Delta PATH_{baro\_lim} = \Delta PATH_{baro} - \Delta H_{corr}$$

else, $$\Delta PATH_{baro\_lim} = \Delta PATH_{baro}$$

where,

|x| is the absolute value function and is unitless.

Blended Path Deviation

The blended path deviation operation is used to smoothly transition the vertical guidance cue (i.e., path deviation information) from the limited baro altitude-referenced path to the GNSS altitude-referenced path yet provide stabilized vertical guidance for the entire descent. This is accomplished by emphasizing $\Delta PATH_{baro\_lim}$ for regions of the descent path which are far above (i.e., before) the FAF and $\Delta PATH_{gnss}$ for regions of the descent path which are near, at and after (i.e., below) the FAF. The blending region is a function of path height above the FAF and automatically compensates for the glide path angle intended to be flown on final approach. The path deviation blending operation is represented by the following algorithms:

If $H_{path} \geq H_{blend\_hi}$, then $$\Delta PATH = \Delta PATH_{baro\_lim}$$

else if $H_{path} \leq H_{blend\_lo}$, then:

$$\Delta PATH = \Delta PATH_{gnss}$$

else:

$$\Delta PATH = \frac{[(H_{path} - H_{blend\_lo}) * \Delta PATH_{baro\_lim}] + [(H_{blend\_hi} - H_{path}) * \Delta PATH_{gnss}]}{(H_{blend\_hi} - H_{blend\_lo})}$$

where:

All units are preferably in feet;

$\Delta PATH_{baro\_lim}$ is the limited deviation from the VNAV descent path using barometric altitude;

$\Delta PATH_{gnss}$ is the deviation from the VNAV descent path using GNSS altitude;

$H_{blend\_hi}$ is the blending algorithm parameter which determines the path height above the FAF where the limited baro altitude to GNSS altitude blending starts; and, $H_{blend\_lo}$ is the blending algorithm constant which determines the path height above the FAF where the limited baro altitude to GNSS altitude blending ends.

Filtered Path Deviation

A low pass filter is applied to the blended path deviation value as the final step in the VNAV path descent computation. The equation for the filtered path deviation is shown below:

$$\Delta PATH_{lpf} = \Delta PATH + [K_{lpf} * (\Delta PATH_{last} - \Delta PATH)]$$

where:

$\Delta PATH_{lpf}$ is defined as the filtered deviation value computed for the VNAV path descent;

$\Delta PATH$ is the current deviation value that was computed for the VNAV path descent;

$K_{lpf}$ is defined as a low pass filter time constant and is unitless; and, $\Delta PATH_{last}$ is defined as the prior deviation value that was computed for the VNAV path descent.

The typical value for $K_{lpf}$ is 0.5.

Other embodiments and configurations may be devised without departing from the spirit of the invention and the scope of the appended claims.

The invention claimed is:

1. A flight management system (FMS) for an aircraft, comprising:
   an integrated barometric altitude and satellite altitude-based vertical navigation (VNAV) system, said integrated barometric altitude and satellite altitude-based vertical navigation system, comprising:
   a) an altitude blending component configured to calculate a smooth transition from a barometric altimetry source to a satellite altimetry source; and,
   b) a satellite altitude containment component operatively connected to said altitude blending component for limiting the difference of a barometric altitude path deviation to within a desired margin of a satellite altitude path deviation.

2. The FMS of claim 1, wherein said altitude blending component, comprises:
   a) means for calculating a barometric altitude referenced path deviation ($\Delta PATH_{baro}$), wherein $\Delta PATH_{baro}$ is defined as the deviation from a VNAV descent path using barometric altitude;
   b) means for calculating a GNSS altitude referenced path deviation ($\Delta PATH_{gnss}$), wherein $\Delta PATH_{gnss}$ is defined as the deviation from the VNAV descent path, using GNSS altitude;
   c) means for calculating a mean sea level (MSL) path height ($H_{path}$) wherein $H_{path}$ is defined as a height above the flight plan final approach fix (FAF) referenced to the vertical point on the FMS VNAV descent path corresponding to the aircraft lateral present position;

d) means for calculating a glide path gradient ($SLOPE_{GPA}$) wherein $SLOPE_{GPA}$ is defined as the glide path gradient representing the vertical gradient on final approach;

e) means for utilizing said $SLOPE_{GPA}$ to determine $H_{blend\_hi}$ as a function of $H_{blend\_lo}$, wherein $H_{blend\_lo}$ is defined as the path height above the FAF where the limited barometric altitude to GNSS altitude blending ends and is a constant, and $H_{blend\_hi}$ is defined as the path height above the FAF where the barometric altitude to GNSS altitude blending starts; and, f) means for utilizing $\Delta PATH_{baro}$, $\Delta PATH_{gnss}$, $H_{path}$, $H_{blend\_hi}$, $H_{blend\_lo}$ to determine $\Delta PATH$, wherein $\Delta PATH$ is defined as the baro and GNSS altitude blended deviation from the VNAV descent path, said $\Delta PATH$ being used to smoothly transition the vertical path deviation information from the barometric altitude-referenced path to the GNSS altitude-referenced path, thus providing stabilized vertical guidance for the entire descent.

3. The FMS of claim 2, wherein:

a) said means for calculating a barometric altitude referenced path deviation ($\Delta PATH_{baro}$) calculates the $\Delta PATH_{baro}$ utilizing the following equation:

$$\Delta PATH_{baro} = ALT_{a/c\_baro} - PATH_{alt\_msl}, \text{ wherein,}$$

$ALT_{a/c\_baro}$ is defined as the sensed pressure altitude corrected for local atmospheric pressure measured by the ADC; and, $PATH_{alt\_msl}$ is defined as the vertical point on the FMS VNAV descent path, which corresponds to aircraft lateral present position, referenced to MSL; and, b) said means for calculating a GNSS altitude referenced path deviation ($\Delta PATH_{gnss}$) calculates the $\Delta PATH_{gnss}$ utilizing the following equation:

$$\Delta PATH_{gnss} = ALT_{a/c\_gnss} - PATH_{alt\_msl}, \text{ wherein,}$$

$ALT_{a/c\_gnss}$ is defined as the sensed GNSS altitude measured by a GPS receiver; and, $PATH_{alt\_msl}$ is the vertical point on the FMS VNAV descent path referenced to said MSL.

4. The FMS of claim 2, wherein:

said means for calculating a mean sea level (MSL) path height ($H_{path}$) calculates the $H_{path}$ utilizing the following equation:

$$H_{path} = PATH_{alt\_msl} - PATH_{alt\_msl\_FAF}, \text{ wherein,}$$

$PATH_{alt\_msl}$ is the vertical point on the FMS VNAV descent path referenced to said MSL; and, $PATH_{alt\_msl\_FAF}$ is defined as the vertical point on the VNAV descent path at the FAF.

5. The FMS of claim 2, wherein:

said means for utilizing said $SLOPE_{GPA}$ to determine $H_{blend\_hi}$ as a function of $H_{blend\_lo}$ utilizes the following equation:

$$H_{blend\_hi} = \left( \frac{GACC_{\Delta h\_min}}{SLOPE_{blend}} * SLOPE_{GPA} \right) + H_{blend\_lo},$$

wherein, $GACC_{\Delta h\_min}$ is the allowable difference between baro altitude and GNSS altitude based path deviations for the minimum width of the GACC; and, $SLOPE_{blend}$ is defined as the slope of the baro altitude to GNSS altitude blending and is a constant.

6. The FMS of claim 1, wherein said satellite altitude containment corridor component, comprises:

a) means for calculating containment corridor parameters, $H_{gacc\_min}$ and $H_{gacc\_max}$ where $H_{gacc\_min}$ is defined as the path height above the FAF where the barometric altitude to GNSS altitude path deviation limit ramping ends; and $H_{gacc\_max}$ is the path height above the FAF where the baro altitude to GNSS altitude path deviation limit ramping starts;

b) means for calculating a GNSS containment corridor ($\Delta H_{gacc}$) from said $H_{gacc\_min}$ and $H_{gacc\_max}$, wherein $\Delta H_{gacc}$ is defined as the allowable difference between barometric altitude and GNSS altitude based path deviations of the GACC at a aircraft lateral present position;

c) means for determining $\Delta H_{corr}$ from said $\Delta H_{gacc}$, wherein $\Delta H_{corr}$ is defined as the path deviations difference correction at the aircraft lateral present position; and, d) means for determining a limited barometric altitude path deviation ($\Delta PATH_{baro\_lim}$) from said $\Delta H_{corr}$ wherein $\Delta PATH_{baro\_lim}$ is defined as the limited deviation from the VNAV descent path using barometric altitude.

7. The FMS of claim 6, wherein:

said means for calculating containment corridor parameters, $H_{gacc\_min}$ and $H_{gacc\_max}$ utilizes the following algorithms:

$$H_{gacc\_min} = H_{blend\_hi}$$

$$H_{gacc\_max} = \left[ \frac{(GACC_{\Delta h\_max} - GACC_{\Delta h\_min})}{SLOPE_{gacc}} * SLOPE_{GPA} \right] + H_{gacc\_min}$$

where, $H_{blend\_hi}$ is the path height above the FAF where the baro altitude to GNSS altitude blending starts in ft;

$\Delta H_{gacc}$ is defined as the allowable difference between barometric altitude and GNSS altitude based path deviations of the GACC at the aircraft lateral present position;

$GACC_{\Delta h\_max}$ is the maximum allowable difference between barometric altitude and GNSS altitude based path deviations of the GACC;

$GACC_{\Delta h\_min}$ is the minimum allowable difference between barometric altitude and GNSS altitude based path deviations of the GACC;

$SLOPE_{gacc}$ is defined as the slope of the barometric altitude to GNSS altitude path deviation limit ramping and is a constant; and, $SLOPE_{GPA}$ is the glide path gradient.

8. The FMS of claim 6, wherein:

said means for calculating a GNSS containment corridor ($\Delta H_{gacc}$) from said $H_{gacc\_min}$ and $H_{gacc\_max}$ utilizes the following algorithms:

If $H_{path} \geq H_{gacc\_max}$, then:

$$\Delta H_{gacc} = GACC_{\Delta hd\_max}$$

else if $H_{path} \leq H_{gacc\_min}$, then:

$$\Delta H_{gacc} = GACC_{\Delta h\_min}$$

else:

$$\Delta H_{gacc} = \left[ \frac{(H_{path} - H_{gacc\_min}) * (GACC_{\Delta h\_max} - GACC_{\Delta h\_min})}{(H_{gacc\_max} - G_{gacc\_min})} \right] + GACC_{\Delta h\_min}$$

If $H_{path} \leq 0$, then:

$$\Delta H_{gacc} = 0$$

where,
$H_{path}$ is the height above the FAF referenced to the vertical point on the FMS VNAV descent path corresponding to aircraft lateral present position;
$\Delta H_{gacc}$ is defined as the allowable difference between barometric altitude and GNSS altitude based path deviations of the GACC at the aircraft lateral present position;
$GACC_{\Delta h\_max}$ is the maximum allowable difference between barometric altitude and GNSS altitude based path deviations of the GACC; and,
$GACC_{\Delta h\_min}$ is the minimum allowable difference between barometric altitude and GNSS altitude based path deviations of the GACC.

9. The FMS of claim 6, wherein:
said means for determining $\Delta H_{corr}$ from said $\Delta H_{gacc}$, comprises:
a) means for determining $\Delta H_{a/c}$, wherein $\Delta H_{a/c}$ is defined as the difference between the barometric and GNSS altitude path deviations at the aircraft lateral present position, as determined by the following equation:

$\Delta H_{a/c} = \Delta PATH_{baro} - \Delta PATH_{gnss}$, wherein, $\Delta PATH_{baro}$ is the deviation from the VNAV descent path using barometric altitude; and,
$\Delta PATH_{gnss}$ is the deviation from the VNAV descent path using GNSS altitude; and,
b) means for determining $\Delta H_{corr}$ from said $\Delta H_{a/c}$ from the following equation:

$\Delta H_{corr} = \Delta H_{a/c} - [\text{sign}(\Delta H_{a/c}) * \Delta H_{gacc}]$, wherein, $\Delta H_{a/c}$ is the difference between the barometric and GNSS altitude path deviations at the aircraft lateral present position.

10. The FMS of claim 9, wherein:
said means for determining a limited barometric altitude path deviation ($\Delta PATH_{baro\_lim}$) from said $\Delta H_{corr}$ utilizes the following algorithms:
If $|\Delta H_{a/c}| \geq \Delta H_{gacc}$, then:

$\Delta PATH_{baro\_lim} = \Delta PATH_{baro} - \Delta H_{corr}$ else:

$\Delta PATH_{baro\_lim} = \Delta PATH_{baro}$ where,
|x| is the absolute value function and is unitless.

11. The FMS of claim 6,
wherein said altitude blending component, comprises:
a) means for calculating a barometric altitude referenced path deviation ($\Delta PATH_{baro}$), wherein $\Delta PATH_{baro}$ is defined as the deviation from a VNAV descent path using barometric altitude;
b) means for calculating a GNSS altitude referenced path deviation ($\Delta PATH_{gnss}$), wherein $\Delta PATH_{gnss}$ is defined as the deviation from the VNAV descent path, using GNSS altitude;
c) means for calculating a mean sea level (MSL) path height ($H_{path}$) wherein $H_{path}$ is defined as a height above the flight plan final approach fix (FAF) referenced to the vertical point on the FMS VNAV descent path corresponding to the aircraft lateral present position;
d) means for calculating a glide path gradient ($SLOPE_{GPA}$) wherein $SLOPE_{GPA}$ is defined as the glide path gradient representing the vertical gradient on final approach;
e) means for utilizing said $SLOPE_{GPA}$ to determine $H_{blend\_hi}$ as a function of $H_{blend\_lo}$, wherein $H_{blend\_lo}$ is defined as the path height above the FAF where the limited barometric altitude to GNSS altitude blending ends and is a constant, and $H_{blend\_hi}$ is defined as the path height above the FAF where the barometric altitude to GNSS altitude blending starts; and,
f) means for utilizing $\Delta PATH_{baro}$, $\Delta PATH_{gnss}$, $H_{path}$, $H_{blend\_hi}$, $H_{blend\_lo}$ to determine $\Delta PATH$, wherein $\Delta PATH$ is defined as the baro and GNSS altitude blended deviation from the VNAV descent path, said $\Delta PATH$ being used to smoothly transition the vertical path deviation information from the barometric altitude-referenced path to the GNSS altitude-referenced path, thus providing stabilized vertical guidance for the entire descent; and,
wherein, said means for utilizing $\Delta PATH_{baro}$, $\Delta PATH_{gnss}$, $H_{path}$, $H_{blend\_hi}$, $H_{blend\_lo}$ to determine $\Delta PATH$ utilizes the following algorithms:
If $H_{path} \geq H_{blend\_hi}$, then:

$\Delta PATH = \Delta PATH_{baro\_lim}$ else if $H_{path} \leq H_{blend\_lo}$, then:

$\Delta PATH = \Delta PATH_{gnss}$ else:

$$\Delta PATH = \frac{[(H_{path} - H_{blend\_lo}) * \Delta PATH_{baro\_lim}] + [(H_{blend\_hi} - H_{path}) * \Delta PATH_{gnss}]}{(H_{blend\_hi} - H_{blend\_lo})}$$

where,
$\Delta PATH_{baro\_lim}$ is the limited deviation from the VNAV descent path using barometric altitude;
$\Delta PATH_{gnss}$ is the deviation from the VNAV descent path using GNSS altitude;
$H_{blend\_hi}$ is the blending algorithm parameter which determines the path height above the FAF where the limited baro altitude to GNSS altitude blending starts; and,
$H_{blend\_lo}$ is the blending algorithm constant which determines the path height above the FAF where the limited baro altitude to GNSS altitude blending ends.

12. A method for integrating barometric altitude and satellite altitude-based vertical navigation in a flight management system (FMS), comprising the steps of:
a) calculating a smooth transition from a barometric altimetry source to a satellite altimetry source; and,
b) limiting the difference of a barometric altitude path deviation to within a desired margin of a satellite altitude path deviation.

13. The method of claim 12, wherein said step of calculating a smooth transition from a barometric altimetry source to a satellite altimetry source, comprises the steps of:
a) calculating a barometric altitude referenced path deviation ($\Delta PATH_{baro}$), wherein $\Delta PATH_{baro}$ is defined as the deviation from a VNAV descent path using barometric altitude;
b) calculating a GNSS altitude referenced path deviation ($\Delta PATH_{gnss}$), wherein $\Delta PATH_{gnss}$ is defined as the deviation from the VNAV descent path, using GNSS altitude;
c) calculating a mean sea level (MSL) path height ($H_{path}$) wherein $H_{path}$ is defined as a height above the flight plan final approach fix (FAF) referenced to the vertical point on the FMS VNAV descent path corresponding to the aircraft lateral present position;
d) calculating a glide path gradient ($SLOPE_{GPA}$) wherein $SLOPE_{GPA}$ is defined as the glide path gradient representing the vertical gradient on final approach;

e) utilizing said $SLOPE_{GPA}$ to determine $H_{blend\_hi}$ as a function of $H_{blend\_lo}$, wherein $H_{blend\_lo}$ is defined as the path height above the FAF where the limited barometric altitude to GNSS altitude blending ends and is a constant, and $H_{blend\_hi}$ is defined as the path height above the FAF where the barometric altitude to GNSS altitude blending starts; and, f) utilizing $\Delta PATH_{baro}$, $\Delta PATH_{gnss}$, $H_{path}$, $H_{blend\_hi}$, $H_{blend\_lo}$ to determine $\Delta PATH$, wherein $\Delta PATH$ is defined as the baro and GNSS altitude blended deviation from the VNAV descent path, said $\Delta PATH$ being used to smoothly transition the vertical path deviation information from the barometric altitude-referenced path to the GNSS altitude-referenced path, thus providing stabilized vertical guidance for the entire descent.

14. The method of claim 13, wherein said step of limiting the difference of a barometric altitude path deviation to within a desired margin of a satellite altitude path deviation satellite altitude containment corridor component, comprises the steps of:

a) calculating containment corridor parameters, $H_{gacc\_min}$ and $H_{gacc\_max}$ where $H_{gacc\_min}$ is defined as the path height above the FAF where the barometric altitude to GNSS altitude path deviation limit ramping ends; and $H_{gacc\_max}$ is the path height above the FAF where the baro altitude to GNSS altitude path deviation limit ramping starts;

b) calculating a GNSS containment corridor ($\Delta H_{gacc}$) from said $H_{gacc\_min}$ and $H_{gacc\_max}$, wherein $\Delta H_{gacc}$ is defined as the allowable difference between barometric altitude and GNSS altitude based path deviations of the GACC at a aircraft lateral present position;

c) determining $\Delta H_{corr}$ from said $\Delta H_{gacc}$, wherein $\Delta H_{corr}$ is defined as the path deviations difference correction at the aircraft lateral present position; and, determining a limited barometric altitude path deviation ($\Delta PATH_{baro\_lim}$) from said $\Delta H_{corr}$, wherein $\Delta PATH_{baro\_lim}$ is defined as the limited deviation from the VNAV.

\* \* \* \* \*